(12) United States Patent
Hansen

(10) Patent No.: US 10,896,311 B2
(45) Date of Patent: Jan. 19, 2021

(54) ACOUSTIC FINGERPRINT REPRESENTATION ACQUISITION TECHNIQUE

(71) Applicant: Fingerprint Cards AB, Gothenburg (SE)

(72) Inventor: Roy Hansen, Dragør (DK)

(73) Assignee: Fingerprint Cards AB, Göteborg (SE)

( * ) Notice: Subject to any disclaimer, the term of this patent is extended or adjusted under 35 U.S.C. 154(b) by 0 days.

(21) Appl. No.: 16/716,591

(22) Filed: Dec. 17, 2019

(65) Prior Publication Data
US 2020/0250392 A1   Aug. 6, 2020

(30) Foreign Application Priority Data

Feb. 6, 2019 (SE) ........................................ 1950139

(51) Int. Cl.
| | |
|---|---|
| *G06K 9/00* | (2006.01) |
| *G06F 21/32* | (2013.01) |
| *G06F 3/043* | (2006.01) |
| *B06B 1/06* | (2006.01) |

(52) U.S. Cl.
CPC .............. *G06K 9/0002* (2013.01); *B06B 1/06* (2013.01); *G06F 3/043* (2013.01); *G06F 21/32* (2013.01); *G06K 9/00067* (2013.01)

(58) Field of Classification Search
CPC .................................. G06F 3/043; B06B 1/06
See application file for complete search history.

(56) References Cited

U.S. PATENT DOCUMENTS

| | | | |
|---|---|---|---|
| 10,198,610 B1 | 2/2019 | Yousefpor et al. | |
| 2004/0168516 A1* | 9/2004 | Kent ..................... | B06B 1/0688 73/579 |
| 2010/0228523 A1* | 9/2010 | Kajitani .................. | G01S 11/16 702/176 |
| 2015/0358740 A1 | 12/2015 | Tsai et al. | |
| 2017/0053151 A1 | 2/2017 | Yazandoost et al. | |
| 2018/0031686 A1 | 2/2018 | Kuo et al. | |
| 2018/0196982 A1* | 7/2018 | Panchawagh ...... | G06K 9/00073 |

OTHER PUBLICATIONS

Swedish Office Action for SE Application No. 1950139-4 dated Sep. 11, 2019, 4 pages.
Swedish Search Report for SE Application No. 1950139-4 dated Sep. 11, 2019, 2 pages.

* cited by examiner

*Primary Examiner* — Joseph R Haley
(74) *Attorney, Agent, or Firm* — RMCK Law Group, PLC

(57) ABSTRACT

An acoustic biometric imaging system for acquiring a fingerprint representation, comprising: a device member; a transmitter transducer having a first fundamental mode resonance frequency, coupled to the device member; drive circuitry; a receiver transducer having a second fundamental mode resonance frequency, coupled to the device member; receiver circuitry; and processing circuitry configured to: control the drive circuitry to provide an electrical excitation signal to the transmit transducer resulting in fundamental mode oscillation of the transmit transducer with a frequency spectrum having a peak frequency being higher than the first fundamental mode resonance frequency and the second fundamental mode resonance frequency; receive, from the receiver circuitry, an electrical sensing signal indicative of an acoustic reflection signal; and determine the fingerprint representation based on the sensing signal received from the receiver circuitry.

15 Claims, 4 Drawing Sheets

ACOUSTIC FINGERPRINT REPRESENTATION ACQUISITION TECHNIQUE

CROSS-REFERENCE TO RELATED APPLICATIONS

This application claims priority to Swedish Patent Application No. 1950139-4, filed on Feb. 6, 2019. The disclosure of the above application is hereby incorporated by reference in its entirety.

FIELD OF THE INVENTION

The present invention relates to an acoustic biometric imaging system, and to a method of acquiring a fingerprint representation.

BACKGROUND OF THE INVENTION

Biometric systems are widely used as means for increasing the convenience and security of personal electronic devices, such as mobile phones etc. Fingerprint sensing systems, in particular, are now included in a large proportion of all newly released personal communication devices, such as mobile phones.

Due to their excellent performance and relatively low cost, capacitive fingerprint sensors are used in an overwhelming majority of all biometric systems.

Among other fingerprint sensing technologies, ultrasonic sensing also has the potential to provide advantageous performance, such as the ability to acquire fingerprint (or palmprint) images from very moist fingers etc.

One class of ultrasonic fingerprint systems of particular interest includes systems in which acoustic signals are transmitted along a surface of a device member to be touched by a user, and a fingerprint (palmprint) representation is determined based on received acoustic signals resulting from the interaction between the transmitted acoustic signals and an interface between the device member and the user's skin.

Such ultrasonic fingerprint sensing systems, which are, for example, generally described in US 2017/0053151 may provide for controllable resolution, and allow for a larger sensing area, which may be optically transparent, without the cost of the fingerprint sensing system necessarily scaling with the sensing area.

Although the general principle of such ultrasonic fingerprint sensing is known, there appear to be remaining challenges to be overcome. For instance, it would be desirable to provide for the detection of finer features of the finger surface.

SUMMARY

In view of above-mentioned and other drawbacks of the prior art, it is an object of the present invention to achieve improved acquisition of a fingerprint representation of a finger surface, in particular providing for the detection of finer features of the finger surface.

According to a first aspect of the present invention, it is therefore provided an acoustic biometric imaging system for acquiring a fingerprint representation of a finger surface, the acoustic biometric imaging system comprising: a device member having a finger touch region for receiving a finger touch of the finger surface; a piezoelectric slab type ultrasound transmitter transducer having a first fundamental mode resonance frequency and being acoustically coupled to the device member in a transducer region of the device member, the transducer region being laterally spaced apart from the finger touch region of the device member; drive circuitry connected to the transmitter transducer; a piezoelectric slab type ultrasound receiver transducer having a second fundamental mode resonance frequency and being acoustically coupled to the device member in the transducer region of the device member; receiver circuitry connected to the receiver transducer; and processing circuitry connected to the drive circuitry and the receiver circuitry, the processing circuitry being configured to: control the drive circuitry to provide an electrical excitation signal to the transmit transducer resulting in fundamental mode oscillation of the transmit transducer with a frequency spectrum having a peak frequency being higher than the first fundamental mode resonance frequency of the transmit transducer and the second fundamental mode resonance frequency of the receiver transducer, the oscillation of the transmit transducer resulting in an acoustic transmit signal being conducted by the device member from the transducer region to the finger touch region; receive, from the receiver circuitry, an electrical sensing signal indicative of an acoustic reflection signal, resulting from reflection of the acoustic transmit signal at an interface between the finger surface and the device member, being conducted by the device member from the finger touch region; and determine the fingerprint representation based on the sensing signal received from the receiver circuitry.

In the context of the present application, the "peak frequency" in the frequency spectrum of the fundamental mode oscillation of the transmitter transducer should be understood to be the frequency at which the oscillation has its highest amplitude.

The transmitter transducer and the receiver transducer may be different transducers. Alternatively, the same transducer may first transmit the acoustic transmit signal, and then receive the acoustic reflection signal.

Other types of acoustic biometric imaging systems exist, in which the finger touch region is directly opposite the transducer region, so that the acoustic transmit signal is propagated directly through the device member from the second side of the device member to the first side of the device member (in the thickness direction of the device member). Such systems have the obvious disadvantage that the finger touch region is predefined and relatively small, since it has to correspond to a region populated with ultrasound transducers.

The acoustic signal properties required for a sufficiently high resolution (ability to detect or resolve sufficiently small fingerprint features) have been found to depend on the acoustic signal propagation properties of the device member and on the acoustic signal propagation properties of the interface between the ultrasound transducer(s) and the device member. For various applications, it may, for example, be desirable to be able to use the display glass of a mobile phone or other electronic device as the device member. For such and other applications, it has been found that the (peak) frequency of the acoustic signal provided to the device member may advantageously be at least 20 MHz in order to be able to resolve sufficiently small fingerprint features. According to common practice for ultrasound imaging systems (such as for medical imaging), a piezoelectric slab type ultrasound transmitter is controlled to oscillate at a resonance frequency, typically the fundamental mode resonance frequency but in some cases also an odd number higher order resonance frequency.

For a piezoelectric slab type ultrasound transducer, there is a relation between the thickness of the transducer and the fundamental mode resonance frequency of the transducer. In particular, a thinner transducer has a higher fundamental mode resonance frequency. This generally applies to transducers adapted for longitudinal mode oscillation as well as to transducers adapted for shear wave mode oscillation.

Accordingly, using the above-described established approach for the high oscillation frequency found to be advantageous for fingerprint imaging of the lateral propagation type using, for example, a display glass, requires the use of thinner transducers. However, a thinner transducer is more difficult and expensive to manufacture, especially when the transducer is thinner than, say, 50 μm.

The present inventor has now surprisingly found that a piezoelectric slab type ultrasound transducer having a fundamental mode resonance frequency can be controlled to provide a fundamental mode oscillation with a frequency spectrum having a peak frequency that is higher than the fundamental mode resonance frequency, and that this can be done with substantially the same performance as would be attainable with a thinner slab type ultrasound transducer having a fundamental mode resonance frequency at the desired frequency. The main reason for this is believed to be that the signal loss resulting from an excursion from the resonance frequency can be compensated for by the higher energy supplying capability of a thicker piezoelectric slab type ultrasound transducer.

Accordingly, embodiments of the present invention provide for detection of finer features of the finger surface. In particular, this can be achieved without the higher manufacturing cost associated with the use of extremely thin piezoelectric slab type ultrasound transducers.

According to various embodiments, the excitation signal may advantageously exhibit, in its frequency domain, a local minimum at the first fundamental mode resonance frequency of the transmit transducer. This configuration of the excitation signal has been found to be very useful to stop the oscillation of the transducer (reduce "ringing"), whereby a flatter frequency response of the acoustic biometric imaging system. This may, in turn, facilitate the processing of the sensing signal and/or improve the quality of the determined fingerprint representation.

As an alternative or complement to such a configuration of the excitation signal, the acoustic biometric imaging system may advantageously comprise a filter for filtering an output from the receiver transducer, wherein the filter may be a high-pass filter of at least the second order and have a cut-off frequency that is higher than the first fundamental mode resonance frequency of the transmit transducer and higher than the second fundamental mode resonance frequency of the receiver transducer.

According to a second aspect of the present invention, there is provided a method of acquiring a fingerprint representation of a finger surface touching a finger touch region of a device member, using an acoustic biometric imaging system including: a piezoelectric slab type ultrasound transmitter transducer having a first fundamental mode resonance frequency and being acoustically coupled to the device member in a transducer region of the device member, the transducer region being laterally spaced apart from the finger touch region of the device member; drive circuitry connected to the transmitter transducer; a piezoelectric slab type ultrasound receiver transducer having a second fundamental mode resonance frequency and being acoustically coupled to the device member in the transducer region of the device member; receiver circuitry connected to the receiver transducer; and processing circuitry connected to the driver circuitry and the receiver circuitry, the method comprising the steps of: controlling the drive circuitry to provide an electrical excitation signal to the transmit transducer resulting in fundamental mode oscillation of the transmit transducer with a frequency spectrum having a peak frequency being higher than the first fundamental mode resonance frequency of the transmit transducer and the second fundamental mode resonance frequency of the receiver transducer, the oscillation of the transmit transducer resulting in an acoustic transmit signal being conducted by the device member from the transducer region to the finger touch region; receiving, from the receiver circuitry, an electrical sensing signal indicative of an acoustic reflection signal, resulting from reflection of the acoustic transmit signal at an interface between the finger surface and the device member, being conducted by the device member from the finger touch region; and determining the fingerprint representation based on the sensing signal received from the receiver circuitry.

In summary, the present invention thus relates to an acoustic biometric imaging system for acquiring a fingerprint representation, comprising: a device member; a transmitter transducer having a first fundamental mode resonance frequency, coupled to the device member; drive circuitry; a receiver transducer having a second fundamental mode resonance frequency, coupled to the device member; receiver circuitry; and processing circuitry configured to: control the drive circuitry to provide an electrical excitation signal to the transmit transducer resulting in fundamental mode oscillation of the transmit transducer with a frequency spectrum having a peak frequency being higher than the first fundamental mode resonance frequency and the second fundamental mode resonance frequency; receive, from the receiver circuitry, an electrical sensing signal indicative of an acoustic reflection signal; and determine the fingerprint representation based on the sensing signal received from the receiver circuitry.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the acoustic biometric imaging system according to the present invention are mainly described with reference to an acoustic biometric imaging system comprising a cover glass for a mobile communication device, with an ultrasonic transducer array attached thereto. It should be noted that acoustic biometric imaging systems with many other configurations also fall within the scope defined by the claims. For instance, the device member need not necessarily be transparent, and/or the ultrasonic transducer array included in the acoustic biometric imaging system may include fewer or more piezoelectric elements. Moreover, the first and second transducer electrodes may be connectable from the same or different sides of the ultrasonic transducers.

Figure 1:
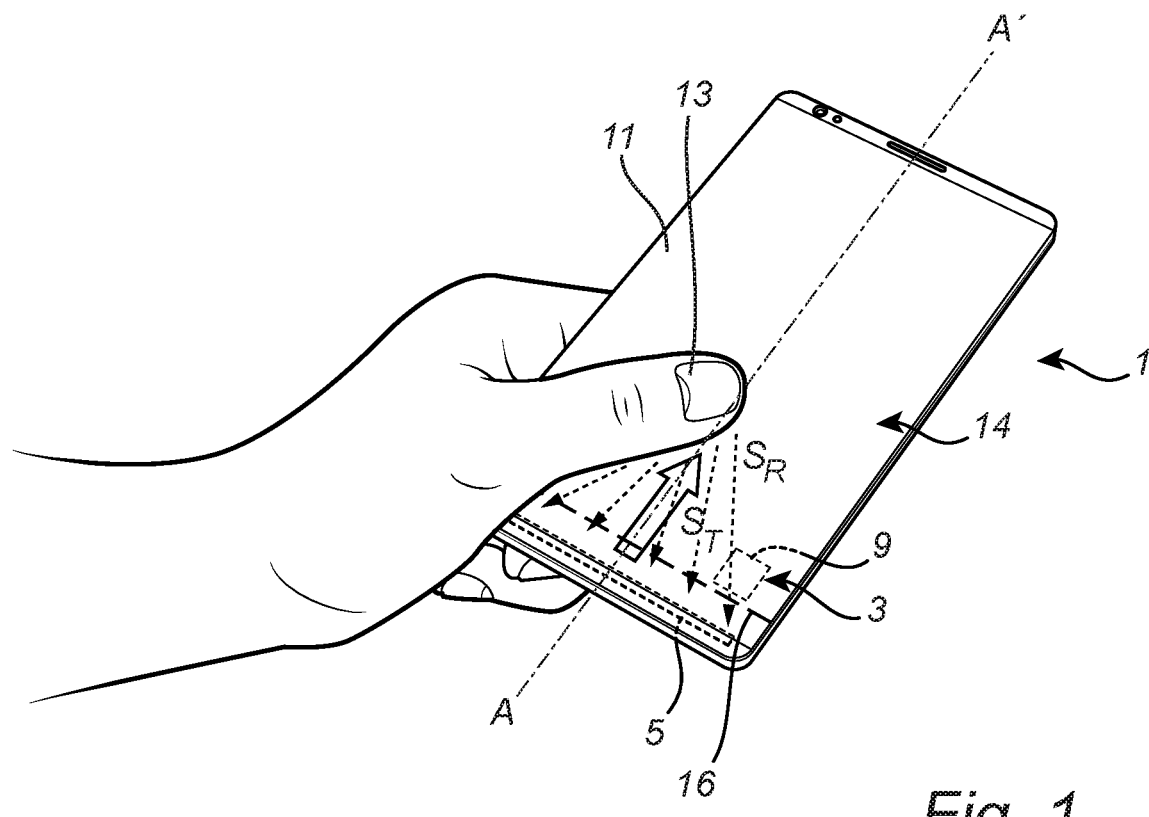
FIG. 1 is an illustration of an exemplary electronic device comprising an acoustic biometric imaging system according to an embodiment of the present invention, in the form of a mobile phone.

The acoustic biometric imaging system according to embodiments of the present invention may be included in various electronic devices. FIG. 1 schematically illustrates a representative electronic device, in the form of a mobile phone 1, comprising an acoustic biometric imaging system 3 according to an embodiment of the present invention.

As is schematically indicated in FIG. 1, the acoustic biometric imaging system 3 may comprise an ultrasonic transducer array 5, and processing circuitry 9 connected to the ultrasonic transducer array 5.

The ultrasonic transducer array 5 is acoustically coupled to a device member, here cover glass 11, of the electronic device 1 in a transducer region, corresponding to the extension of the ultrasonic transducer array 5. The user touch, which takes place in a finger touch region 14 laterally spaced apart from the first transducer region 5, is indicated by the thumb 13 in FIG. 1. An exemplary near zone limit of the finger touch region 14 is schematically indicated by the dashed line 16 in FIG. 1.

When the acoustic biometric imaging system 3 is in operation, the processing circuitry 9 controls one or several piezoelectric element(s) comprised in the ultrasonic transducer array 5 to transmit an acoustic transmit signal $S_T$, indicated by the block arrow in FIG. 1. Further, the processing circuitry 9 controls the ultrasonic transducer array 5 to receive an acoustic reflection signals $S_R$ resulting from reflection of the acoustic transmit signal at an interface between the finger surface and the device member 11, being conducted by the device member 11 from the finger touch region 14. The acoustic reflection signal $S_R$ is transformed to an electrical sensing signal by the receiving piezoelectric elements in the ultrasonic transducer array 5, and the electrical signals are processed by the processing circuitry 9 to provide a representation of the fingerprint of the user.

The acoustic reflection signal $S_R$ is presently believed to mainly be due to so-called contact scattering at the contact area between the cover glass and the skin of the user (thumb 13).

The acoustic transmit signal $S_T$ may advantageously be a pulse train of short pulses (impulses), and the acoustic reflection signal $S_R$, which may be measured for different angles by different receiving piezoelectric elements, may then be impulse responses. The impulse response data carried by the acoustic reflection signal $S_R$ can be used to reconstruct a representation of the contact area (the fingerprint) using a reconstruction procedure similar to methods used in ultrasound reflection tomography.

It should be understood that the "representation" of the fingerprint of the user may be any information extracted based on the received acoustic reflection signal $S_R$, which is useful for assessing the similarity between fingerprint representations acquired at different times. For instance, the representation may comprise descriptions of fingerprint features (such as so-called minutiae) and information about the positional relationship between the fingerprint features. Alternatively, the representation may be a fingerprint image, or a compressed version of the image. For example, the image may be binarized and/or skeletonized. Moreover, the fingerprint representation may be the above-mentioned impulse response representation.

Figure 2:
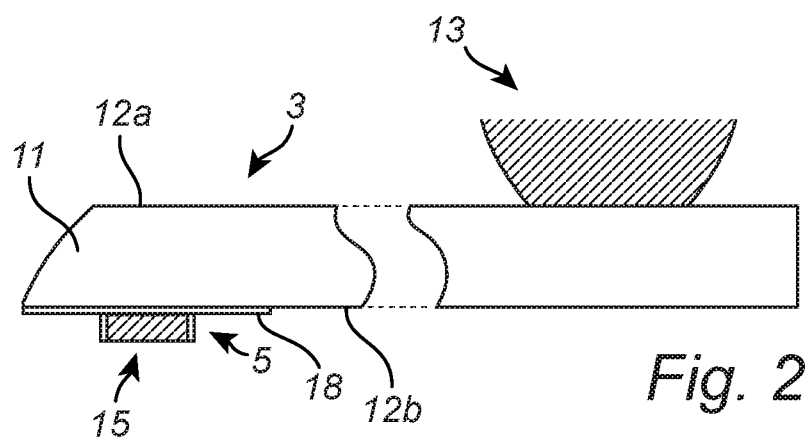
FIG. 2 is a schematic cross-section view of the acoustic biometric imaging system in FIG. 1, with the section taken along the line A-A' in FIG. 1.

FIG. 2 is a schematic cross-section view of the acoustic biometric imaging system 3 in FIG. 1, with the section taken along the line A-A' in FIG. 1. Referring to FIG. 2, the device member 11, here cover glass, has a first face 12a to be touched by a finger surface of a user, and a second face 12b opposite the first face 12a. The ultrasonic transducer array 5 comprises a plurality of ultrasonic transducers 15. Each of the ultrasonic transducers 15 is acoustically coupled to the second face 12b of the device member 11. As can be seen in FIG. 2, in this embodiment, the acoustic biometric imaging system 3 further comprises an opaque masking layer 18 arranged between the second face 12b of the device member 11 (cover glass) and the ultrasonic transducers 15 in the ultrasonic transducer array 5. The opaque masking layer 18 renders the ultrasonic transducer array 5 invisible from the first face 12 of the device member 11, and can be colored as desired.

Figure 3A:
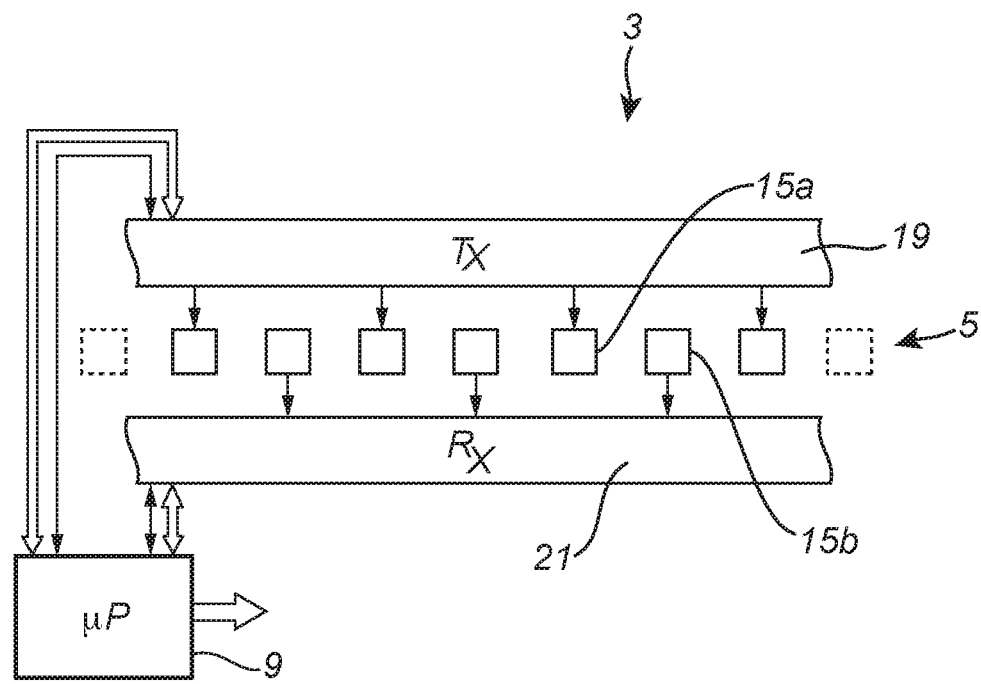
FIG. 3A is a schematic functional illustration of a first embodiment of the acoustic biometric imaging system according to the present invention.

FIG. 3A is a schematic functional illustration of a first embodiment of the acoustic biometric imaging system according to the present invention. Referring to FIG. 3A, the acoustic biometric imaging system 3 according to the first example embodiment of the invention comprises drive circuitry 19 connected to dedicated transmitter transducers 15a in the transducer array 5, and receiver circuitry 21 connected to dedicated receiver transducers 15b in the transducer array 5. As is schematically indicated by the arrows (line arrows for control signals and block arrows for data) in FIG. 3A, the processing circuitry 9 is connected to the drive circuitry 19 and to the receiver circuitry 21. As will be explained in greater detail further below, the processing circuitry 9 is configured to control the drive circuitry 19 to provide an electrical excitation signal to the transmit transducers 15a, and to receive an electrical sensing signal from the receiver circuitry 21 that is indicative of an acoustic reflection signal ($S_R$ in FIG. 1) that has been picked up by the receiver transducers 15b.

Figure 3B:
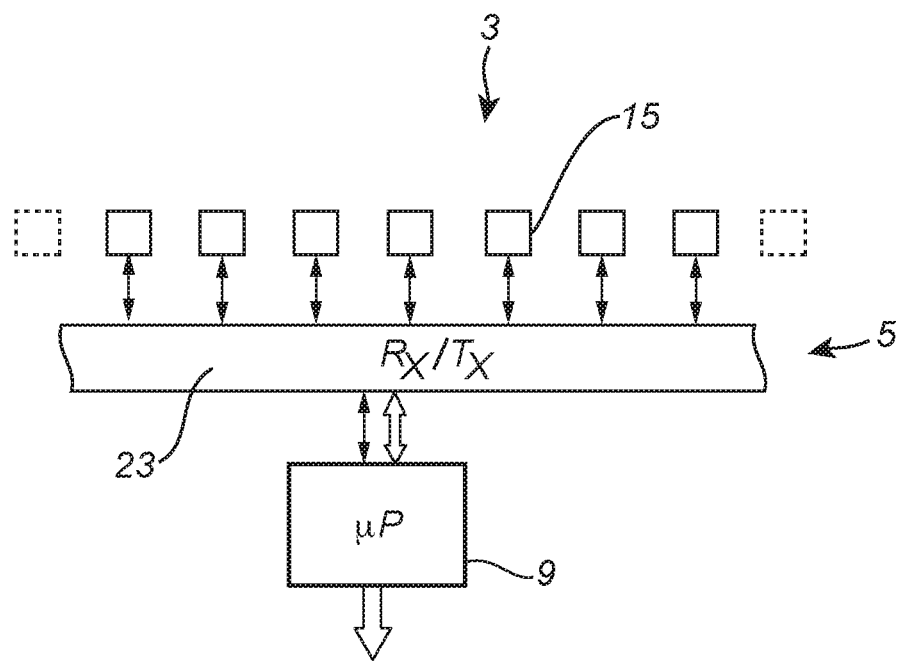
FIG. 3B is a schematic functional illustration of a second embodiment of the acoustic biometric imaging system according to the present invention.

FIG. 3B is a schematic functional illustration of a second embodiment of the acoustic biometric imaging system according to the present invention. Referring to FIG. 3B, the acoustic biometric imaging system 3 according to the second example embodiment of the invention comprises transceiver circuitry 23 connected to the transducers 15 in the transducer array 5. As is schematically indicated by the arrows (line arrows for control signals and block arrows for data) in FIG. 3B, the processing circuitry 9 is connected to the transceiver circuitry 23. In this second embodiment, the transmitter transducer (15a in FIG. 3A) and the receiver transducer (15b in FIG. 3A) are thus constituted by a transceiver transducer 15, which first transmits an acoustic transmit signal $S_T$, and then receives an acoustic reflection signal $S_R$. Furthermore, in this second embodiment, the drive circuitry 19 and the receiver circuitry 21 in FIG. 3A are illustrated as transceiver circuitry 23. It should be noted that the general configuration of the drive circuitry 19 and receiver circuitry 21 in FIG. 3A and the transceiver circuitry 23 in FIG. 3B may be identical or similar.

Figure 4:
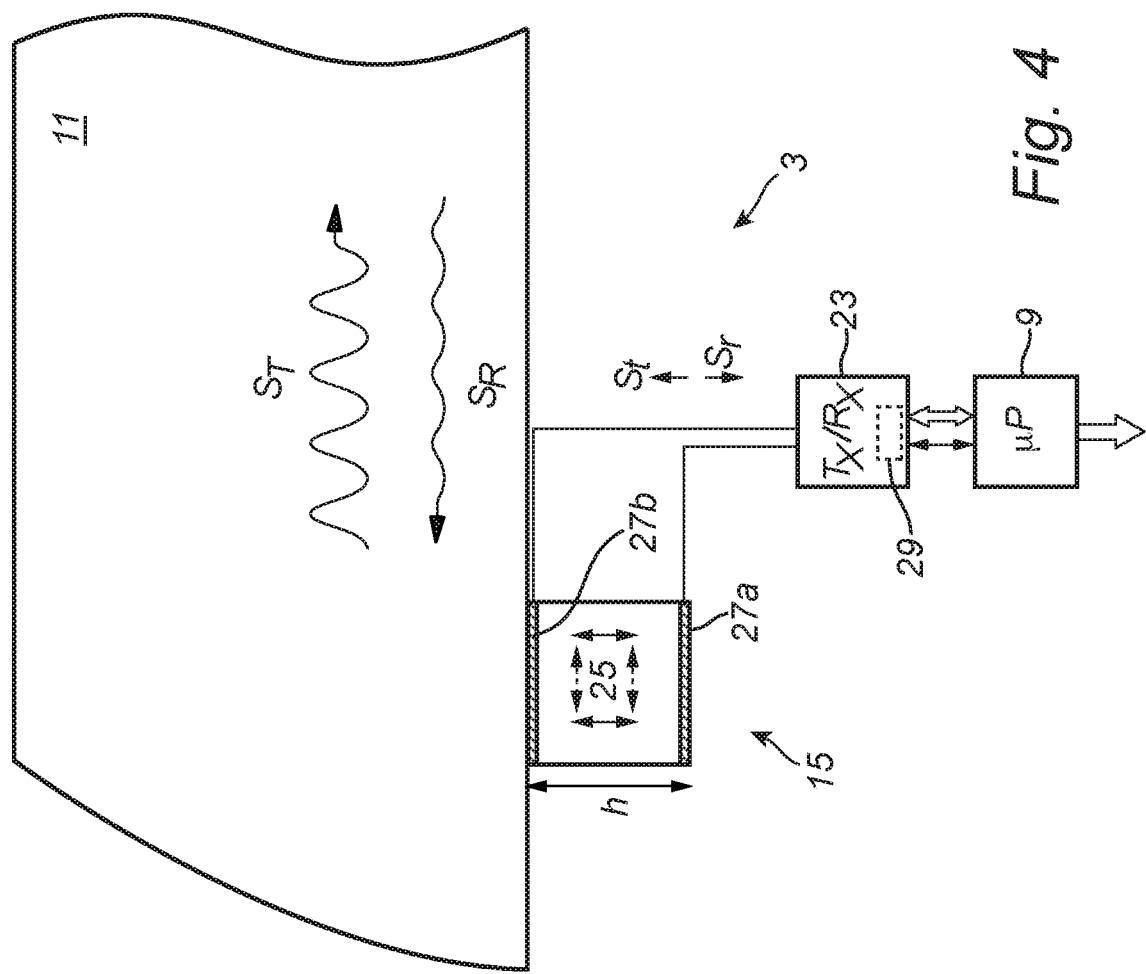
FIG. 4 is a partly structural and partly functional illustration of an example embodiment of the acoustic biometric imaging system according to the present invention.

FIG. 4 is a partly structural and partly functional illustration of an example embodiment of the acoustic biometric imaging system according to the present invention. As is more clearly visible in FIG. 4, the ultrasound transceiver transducer 15 is a piezoelectric slab type ultrasound transducer comprising a piezoelectric element 25, a first electrode 27a and a second electrode 27b.

As is indicated in FIG. 4, the piezoelectric element 25 has a certain thickness h. For a given material of the piezoelectric element 25, and other dimensions (length and width) of the piezoelectric element 25, the thickness h determines the fundamental mode resonance frequency of the ultrasound transducer 15. This is the case for a transducer adapted for longitudinal oscillation (schematically indicated by solid arrows in the piezoelectric element 25) as well as for a transducer adapted for shear wave oscillation (schematically indicated by dashed arrows in the piezoelectric element 25). In embodiments, the thickness h of the transducers 15 may be at least 40 µm.

As is schematically shown in FIG. 4, the transceiver circuitry 23 is connected to the first 27a and second 27b electrodes of the transducer 15. An electrical excitation signal $S_t$ (time-varying voltage across the first 27a and second 27b electrodes) from the transceiver circuitry 23 results in oscillation of the transducer 15 (acting as transmitter transducer). Since the transducer 15 is acoustically coupled to the device member 11, the oscillation of the transducer 15 results in an acoustic transmit signal $S^T$ being conducted by the device member 11 towards the finger touch region (14 in FIG. 1). The acoustic reflection signal $S_R$ resulting from reflection of the acoustic transmit signal $S_T$ at an interface between the finger surface and the device member 11 is conducted by the device member 11 back towards the transducer 15. The transducer 15 (now acting as receiver transducer) oscillates in response to the acoustic reflection signal $S_R$, and the oscillation of the transducer 15 results in an electrical sensing signal $S_r$, which is received by the transceiver circuitry 23, as is schematically indicated in FIG. 4. The transceiver circuitry 23, which may optionally comprise a filter 29 for filtering the sensing signal $S_r$ from the transducer 15, is connected to the processing circuitry 9 for receiving control signals and providing the sensing signal (which may be filtered by the filter 29) to the processing circuitry. The filter 29 may advantageously be at least of the second order.

In particular, the filter 29 may advantageously comprise an equalizer filter for flattening the frequency response of the transducer 15. This is particularly desirable in embodiments of the present invention, because the peak frequency of the excitation signal $S_t$ provided by the transceiver 23 is higher than the fundamental mode resonance frequency $f_{res}$ of the transducer 15.

The frequency response of the transmit transducer and the receiver transducer (or of two passes through the "transceiver" transducer 15) can be modelled as two identical second order bandpass filters, with opposite slopes on opposite sides of the fundamental mode resonance frequency $f_{res}$ of the transducer 15. This is the case when the same transducer 15 is used for transmitting and receiving and when the first and second fundamental mode resonance frequencies are the same. In embodiments with separate transmit and receiver transducers with different fundamental mode resonance frequencies, the situation will be a little more complicated, but fully understandable to one of ordinary skill in the art, based on the description herein.

To "straighten" the frequency response of the measurement chain including the transducer(s) 15 and the transceiver 23, it may therefore be desirable to pass the electrical sensing signal $S_r$ through an equalizer filter 29 implemented as a second, or higher, order high-pass filter having a cut-off frequency that is higher than the fundamental mode resonance frequency $f_{res}$ of the transducer 15. In particular, the cut-off frequency of the equalizer filter 29 may advantageously be at least 25% higher than the fundamental mode resonance frequency $f_{res}$ of the transducer 15. In embodiments, the filter 29 may additionally include an anti-aliasing filter.

An example method according to embodiments of the invention will now be described with reference to the flow-chart in FIG. 5, and the illustrations in FIG. 4, FIG. 6 and FIG. 7.

In a first step S1, an excitation signal $S_t$ is provided to the transducer 15. More specifically, the processing circuitry 9 controls the transceiver circuitry 23 (or drive circuitry) to provide the electrical excitation signal $S_t$ to the transducer 15. The excitation signal $S_t$ is configured in such a way that the transducer 15 (or transmit transducer 15a) exhibits a fundamental mode oscillation with a frequency spectrum having a peak frequency being higher than the fundamental mode resonance frequency $f_{res}$ of the transducer 15.

According to embodiments of the present invention, the excitation signal $S_t$ may advantageously exhibit, in the frequency domain, a local minimum at the fundamental mode resonance frequency $f_{res}$ of the transducer 15. Hereby, a relatively flat frequency response of the (transmit) transducer 15 can be achieved, which may be beneficial for the processing of the received reflection signal $S_R$.

This effect will now be illustrated with reference to FIG. 6 and FIG. 7.

Figure 6:
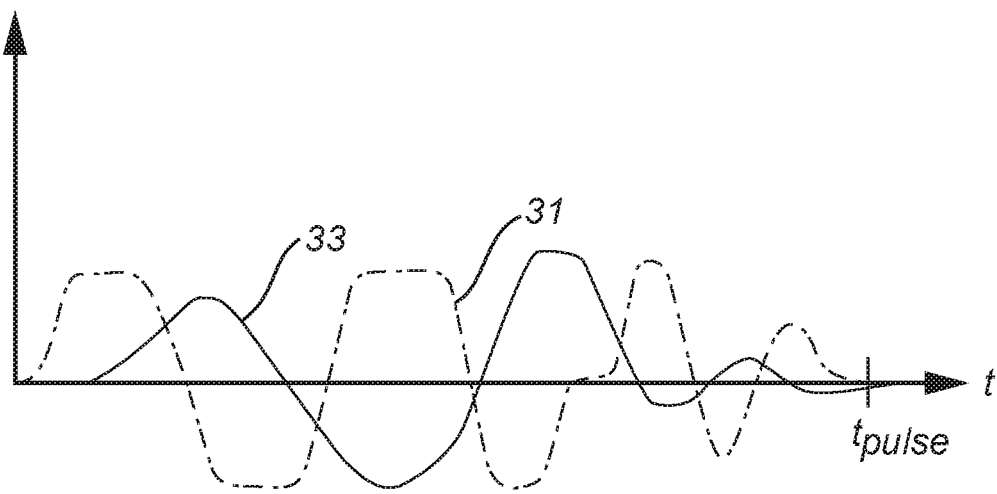
FIG. 6 is a diagram schematically showing, in the time domain, an example excitation signal in an acoustic biometric imaging system according to embodiments of the present invention, and a resulting oscillation of a transmit transducer in the acoustic biometric imaging system.

FIG. 6 is a diagram schematically showing, in the time domain, an example configuration 31 of the excitation signal $S_t$, and the resulting acoustic transmit signal 33 provided by the transducer 15. In this particular example, the transducer 15 is configured for shear wave oscillation, and the acoustic transmit signal 33 is thus a shear wave signal. For the desired ability to resolve sufficiently small fingerprint features, each excitation signal pulse 31 in the excitation signal may advantageously have a duration $t_{pulse}$ that is less than 200 ns.

Figure 7:
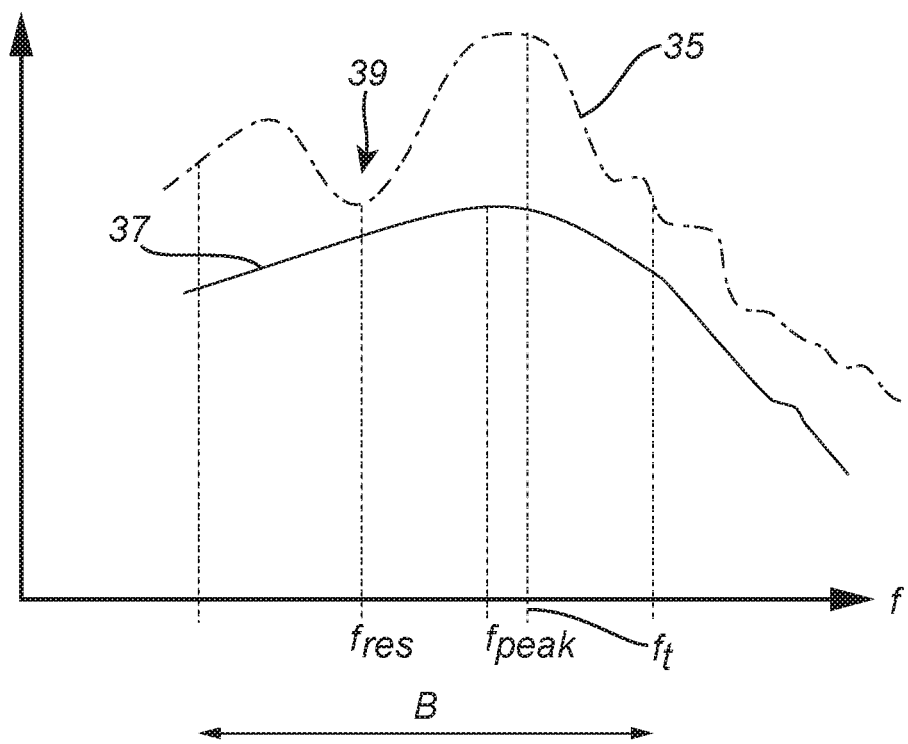
FIG. 7 is a diagram schematically showing the signals in FIG. 6 in the frequency domain.

FIG. 7 is a diagram schematically showing the frequency spectrum 35 of the transmit signal 31 and the frequency spectrum 37 of the acoustic transmit signal 33.

As can be seen in FIG. 7, the excitation signal 31 exhibits a local minimum 39 at the fundamental mode resonance frequency $f_{res}$ of the transducer 15, and the frequency spectrum 37 of the fundamental mode oscillation of the transducer 15 has a peak frequency $f_{peak}$ that is higher than the fundamental mode resonance frequency $f_{res}$. Furthermore, the frequency spectrum of the transducer oscillation is reasonably flat in the relevant measurement bandwidth, schematically indicated by the frequency range 'B' in FIG. 7.

The excitation signal $S_t$ may, in the frequency domain, exhibits its highest amplitude at an excitation signal peak frequency $f_t$ that is at least 25 percent higher than the fundamental mode resonance frequency $f_{res}$ off the transmit transducer 15. In embodiments, the excitation signal peak frequency $f_t$ may be at least 20 MHz.

Figure 5:
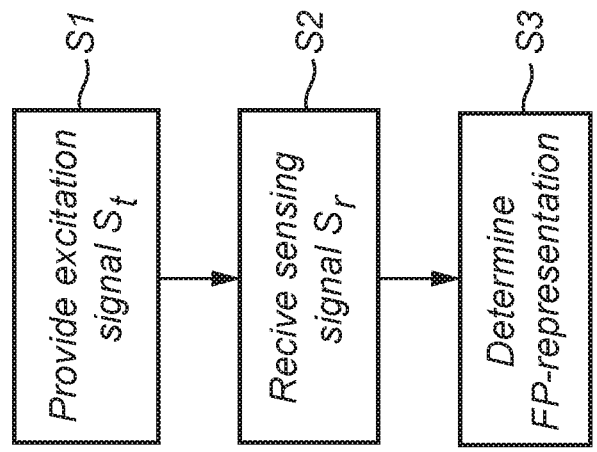
FIG. 5 is a flow-chart illustrating an example embodiment of the method according to the present invention.

Returning to the flow-chart in FIG. 5, the method proceeds to step S2, where the processing circuitry 9 receives the electrical sensing signal $S_r$ from the transceiver circuitry 23 (or receiver circuitry 21) as described further above.

Finally, in step S3, the fingerprint representation is determined, by the processing circuitry 9, based on the sensing signal $S_r$.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. An acoustic biometric imaging system for acquiring a fingerprint representation of a finger surface, the acoustic biometric imaging system comprising:
    a device member having a finger touch region for receiving a finger touch of the finger surface;
    a piezoelectric slab type ultrasound transmitter transducer having a first fundamental mode resonance frequency and being acoustically coupled to the device member in a transducer region of the device member, the transducer region being laterally spaced apart from the finger touch region of the device member;
    drive circuitry connected to the transmitter transducer;
    a piezoelectric slab type ultrasound receiver transducer having a second fundamental mode resonance frequency and being acoustically coupled to the device member in the transducer region of the device member;
    receiver circuitry connected to the receiver transducer; and
    processing circuitry connected to the drive circuitry and the receiver circuitry, the processing circuitry being configured to:
        control the drive circuitry to provide an electrical excitation signal to the transmit transducer resulting in fundamental mode oscillation of the transmit transducer with a frequency spectrum having a peak frequency being higher than the first fundamental mode resonance frequency of the transmit transducer and the second fundamental mode resonance frequency of the receiver transducer, the oscillation of the transmit transducer resulting in an acoustic transmit signal being conducted by the device member from the transducer region to the finger touch region;
        receive, from the receiver circuitry, an electrical sensing signal indicative of an acoustic reflection signal, resulting from reflection of the acoustic transmit signal at an interface between the finger surface and the device member, being conducted by the device member from the finger touch region; and
        determine the fingerprint representation based on the sensing signal received from the receiver circuitry.

2. The acoustic biometric imaging system according to claim 1, wherein the excitation signal, in the frequency domain, exhibits a local minimum at the first fundamental mode resonance frequency of the transmit transducer.

3. The acoustic biometric imaging system according to claim 1, wherein the excitation signal, in the frequency domain, exhibits its highest amplitude at an excitation signal peak frequency that is at least 25 percent higher than the first fundamental mode resonance frequency of the transmit transducer.

4. The acoustic biometric imaging system according to claim 3, wherein the excitation signal peak frequency is at least 20 MHz.

5. The acoustic biometric imaging system according to claim 1, wherein each of a thickness of the transmit transducer and a thickness of the receiver transducer is at least 40 µm.

6. The acoustic biometric imaging system according to claim 1, wherein the excitation signal is provided in the form of a pulse train, each pulse in the pulse train having a duration less than 200 ns.

7. The acoustic biometric imaging system according to claim 1, wherein the receiver circuitry comprises a filter for filtering an output from the receiver transducer.

8. The acoustic biometric imaging system according to claim 7, wherein the filter is at least of the second order.

9. The acoustic biometric imaging system according to claim 8, wherein the filter is a high pass filter having a cut-off frequency that is higher than the first fundamental mode resonance frequency of the transmit transducer and higher than the second fundamental mode resonance frequency of the receiver transducer.

10. The acoustic biometric imaging system according to claim 1, wherein the transmitter transducer and the receiver transducer are constituted by a transceiver transducer.

11. The acoustic biometric imaging system according to claim 1, comprising a plurality of transmitter transducers arranged in an array and a plurality of receiver transducers arranged in an array.

12. The acoustic biometric imaging system according to claim 1, wherein the device member is optically transparent.

13. An electronic device comprising:
    the acoustic biometric imaging system according to claim 1; and
    a controller configured to:
        acquire the fingerprint representation from the acoustic biometric imaging system;
        authenticate a user based on the fingerprint representation; and
        perform at least one user-requested process only if the user is authenticated based on the fingerprint representation.

14. A method of acquiring a fingerprint representation of a finger surface touching a finger touch region of a device member, using an acoustic biometric imaging system including:
    a piezoelectric slab type ultrasound transmitter transducer having a first fundamental mode resonance frequency and being acoustically coupled to the device member in a transducer region of the device member, the transducer region being laterally spaced apart from the finger touch region of the device member;
    drive circuitry connected to the transmitter transducer;
    a piezoelectric slab type ultrasound receiver transducer having a second fundamental mode resonance frequency and being acoustically coupled to the device member in the transducer region of the device member;
    receiver circuitry connected to the receiver transducer; and
    processing circuitry connected to the driver circuitry and the receiver circuitry,
    the method comprising the steps of:
        controlling the drive circuitry to provide an electrical excitation signal to the transmit transducer resulting in fundamental mode oscillation of the transmit transducer with a frequency spectrum having a peak frequency being higher than the first fundamental mode resonance frequency of the transmit transducer and the second fundamental mode resonance frequency of the receiver transducer, the oscillation of the transmit transducer resulting in an acoustic transmit signal being conducted by the device member from the transducer region to the finger touch region;

receiving, from the receiver circuitry, an electrical sensing signal indicative of an acoustic reflection signal, resulting from reflection of the acoustic transmit signal at an interface between the finger surface and the device member, being conducted by the device member from the finger touch region; and determining the fingerprint representation based on the sensing signal received from the receiver circuitry.

15. The method according to claim 14, wherein the excitation signal, in the frequency domain, exhibits a local minimum at the first fundamental mode resonance frequency of the transmit transducer.

* * * * *